(12) United States Patent
Chien et al.

(10) Patent No.: US 11,935,409 B2
(45) Date of Patent: Mar. 19, 2024

(54) PREDICTIVE VEHICLE PARKING SYSTEMS

(71) Applicant: AT&T Intellectual Property I, L.P., Atlanta, GA (US)

(72) Inventors: Ginger Chien, Bellevue, WA (US); Zhi Cui, Sugar Hill, GA (US); Eric Zavesky, Austin, TX (US); Robert T. Moton, Jr., Alpharetta, GA (US); Adrianne Binh Luu, Atlanta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 217 days.

(21) Appl. No.: 17/513,185

(22) Filed: Oct. 28, 2021

(65) Prior Publication Data

US 2023/0137256 A1 May 4, 2023

(51) Int. Cl.
G08G 1/14 (2006.01)
G06N 5/04 (2023.01)
G06Q 10/02 (2012.01)

(52) U.S. Cl.
CPC ............. G08G 1/141 (2013.01); G06N 5/04 (2013.01); G06Q 10/02 (2013.01)

(58) Field of Classification Search
CPC .......... G08G 1/141; G06N 5/04; G06Q 10/02
USPC ...................................................... 340/932.2
See application file for complete search history.

(56) References Cited

U.S. PATENT DOCUMENTS

| | | | | |
|---|---|---|---|---|
| 9,043,083 | B2* | 5/2015 | Kadowaki | B60R 1/00 340/932.2 |
| 9,711,048 | B1* | 7/2017 | Knas | G08G 1/144 |
| 2009/0271227 | A1* | 10/2009 | Hayat | G06Q 10/025 705/26.1 |
| 2017/0236418 | A1* | 8/2017 | Bostick | G06V 20/586 340/932.2 |
| 2023/0005368 | A1* | 1/2023 | Higuchi | G08G 1/141 |

OTHER PUBLICATIONS

Scientific Research, "Intelligent Parking System", World Journal of Engineering and Technology, vol. 4, No. 2, May 2016, 15 pages.
Nexpa, "Intelligent Parking", accessed on Oct. 18, 2021 from https://www.nexpa.io/, 6 pages.
Hikvision, "The power of intelligent parking management", accessed on Oct. 18, 2021 from https://www.hikvision.com/en/newsroom/latest-news/2020/the-power-of-intelligent-parking-management/, 3 pages.

* cited by examiner

Primary Examiner — Kerri L McNally (57) ABSTRACT

A processing system including at least one processor may obtain a parking request for a vehicle to park at a parking facility and may offer a plurality of parking spots of the parking facility for the vehicle, where at least one of the plurality of parking spots that is offered is a parking spot that is predicted to be available, and where the offering includes presenting information regarding predicted adjacent parking spot occupancy of the at least one of the plurality of parking spots for a duration of an intended stay of the vehicle at the parking facility. The processing system may then obtain a selection of a parking spot from among the plurality of parking spots and reserve the parking spot for the vehicle.

20 Claims, 4 Drawing Sheets

PREDICTIVE VEHICLE PARKING SYSTEMS

The present disclosure relates generally to parking system technologies, e.g., "smart" or "intelligent" parking systems, and more particularly to methods, computer-readable media, and apparatuses for offering for a vehicle a parking spot of a parking facility that is predicted to be available and presenting information regarding predicted adjacent parking spot occupancy of the parking spot for a duration of an intended stay of the vehicle at the parking facility.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality. In addition, autonomous vehicles are increasingly being utilized for a variety of commercial and other useful tasks, such as package deliveries, search and rescue, mapping, surveying, and so forth, enabled at least in part by these wireless communication technologies.

SUMMARY

In one example, the present disclosure describes a method, computer-readable medium, and apparatus for offering for a vehicle a parking spot of a parking facility that is predicted to be available and presenting information regarding predicted adjacent parking spot occupancy of the parking spot for a duration of an intended stay of the vehicle at the parking facility. For example, a processing system including at least one processor may obtain a parking request for a vehicle to park at a parking facility and may offer a plurality of parking spots of the parking facility for the vehicle, where at least one of the plurality of parking spots that is offered is a parking spot that is predicted to be available, and where the offering includes presenting information regarding predicted adjacent parking spot occupancy of the at least one of the plurality of parking spots for a duration of an intended stay of the vehicle at the parking facility. The processing system may then obtain a selection of a parking spot from among the plurality of parking spots and reserve the parking spot for the vehicle.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure provide for methods, computer-readable media, and apparatuses for offering for a vehicle a parking spot of a parking facility that is predicted to be available and presenting information regarding predicted adjacent parking spot occupancy of the parking spot for a duration of an intended stay of the vehicle at the parking facility. For instance, examples of the present disclosure address parking for both autonomous and non-autonomous vehicles, including their interactions and dependencies. Current parking of passenger vehicles in an environment where both autonomous and non-autonomous vehicles jointly use a parking facility, such as a parking lot or parking deck, may be inefficient and may inadequately address the requirements or preferences of drivers and/or other occupants (e.g., vehicle "users"). Examples of the present disclosure account for the requirements or preferences of vehicle users as inputs, provide greater convenience and safety, and address particular conditions and opportunities that arise in the environment of a parking facility that accommodates both autonomous and non-autonomous vehicles.

A parking facility may be defined as a set of parking spots. These may be in a parking lot, a parking deck, or other collections of available parking spots (such as marked spaces on a grass or dirt field, etc.). One or more parking spots may each be equipped with a parking spot sensor that is capable of detecting the presence of a vehicle in the parking spot and communicating the presence of the vehicle (e.g., parking space occupancy) to a parking facility management system (e.g., one or more servers). In addition, a user may be equipped with a mobile device, such as a smartphone, which may have installed and operating thereon an application (app) associated with the parking facility. Alternatively, or in addition, the user's vehicle may be similarly equipped with a computing system, e.g., a processing system, running a vehicle app associated with the parking facility. In each case, the app may communicate with the parking facility management system.

In one example, the parking facility management system may include or may access a parking spot inventory database that may contain an entry for each parking spot in the parking facility. For instance, for each parking spot, the entry/record may include: the size of the parking spot, whether the parking spot is under a cover, a current state of occupancy, e.g., based on sensor readings, a duration of time the parking spot has been in a current state of occupancy, coordinates or other identifiers of a location of the parking spot, and so forth. In accordance with the present disclosure, the entry/record may also include historical data for the percentage of time that parking spots that are adjacent to the parking spot and/or within a zone of the parking spot are occupied. For example, this information may be useful to new vehicles entering the parking facility or seeking reservations at the parking facility. For instance, if a user of the vehicle prefers to avoid parking next to another vehicle, this information may inform the user as to which parking spots to consider for a better chance to have no neighboring parked vehicles. In one example, the entry/record may also include a predicted future time when the state of occupancy of a parking spot may change (e.g., either a vehicle occupying the spot or a vehicle vacating the spot based upon a reservation and/or a user itinerary).

In one example, when a user arrives at the parking facility in the user's vehicle, the user's mobile device app or the vehicle app may communicate user and vehicle information, such as the user's requirements and/or preferences, to the parking facility management system. For example, the app may communicate an estimated duration for parking, the size of the parking space required, the user's preference for a likelihood of one or more neighboring spots being occupied, and so forth. In one example, the user and vehicle information may include the user's destination after parking. For instance, if the parking facility is located at an airport or caters to users who are flying via the airport, working at the airport, or otherwise visiting the airport, the destination after parking may be the user's airline, a departing gate, a departing terminal, or other information.

The parking facility management system may use the data received from the app as well as data from the parking spot inventory database to determine one or more currently available spots that are options for the user (e.g., for the user's vehicle). The options may be presented to the user based on characteristics of each parking spot that is available. For instance, the "closest" parking spot may be identified as the one that is closest to the destination of the user after parking. The least expensive parking spot may be labeled as "cheapest" (and where there are multiple parking spots having the same least cost, the one that is also closest to the user's destination after parking). A "safest" spot may be labeled as one that is marked as safe in the parking spot inventory database based on nearby lighting, proximity to well-traveled walking areas, security cameras, attendant kiosk(s), and/or proximity to the destination after parking. A "most protected" parking spot may be labeled as an available parking spot that is covered and that also has the lowest historical percentage of time in which vehicles occupy immediate neighboring parking spots. A "most protected" parking spot may also be determined based upon a metric that accounts for least number of damage claims over a historical time period, or a composite metric (e.g., a score based on a number of damage claims, whether the parking spot is covered or uncovered, and/or or a level of neighboring and/or adjacent parking spot occupancy, etc.). In one example, these options may be presented via a display of a map of the parking facility, one or more real-time camera feeds, one or more simulated images of the facility, or the like sent to the vehicle and/or the user's mobile device.

In one example, parking spot options presented to the user and/or to the vehicle may be identified based on those parking spots that are marked as currently available in the parking spot inventory database. However, there are also possibly one or more parking spots presented to the user and/or to the vehicle that may be indicated as having predicted availability. These parking spots may be offered at a discounted rate, for instance, but their availability may not be guaranteed by the time the user's vehicle arrives at the parking facility (e.g., a vehicle is currently occupying the spot but is scheduled to vacate the spot in the near future or the vehicle is already overdue in vacating the spot). When offered to the user as an option, such parking spots may specifically be noted as not guaranteed, such as by labeling "Not A Guaranteed Spot," or the like.

In one example, a parking spot's predicted availability may be determined based on a value for a "predicted state change" for the parking spot in an entry/record in the parking spot inventory database. For example, a first parking spot may be occupied by a first user's vehicle. When the first user initially parked his or her vehicle, the user may have opted to share information about his or her travel itinerary, such as a planned return date and time, and in an example of an airport parking facility, a flight number, etc. Accordingly, the parking facility management system may be in communication with a flight status database and may receive data about when the flight arrives. The first user may have also elected to share the location of the user's mobile device and other information such as whether the user has checked any bags. The parking facility management system may use all of this information to derive the first user's location, walking pace, expected baggage wait time, etc. to estimate or predict a time of arrival at the first user's vehicle. If the predicted time until a parking spot becomes available falls below a threshold, it may be designated to be presented as "predicted available" soon for a second user arriving at the parking facility but such "predicted availability" is not a guarantee of a vacant spot.

Upon being presented with the options, the second user (e.g., the user arriving at the facility) may select a parking spot to reserve (and similarly for a user making an advance reservation for a future time period). The selection may be via a spoken input or via a selection of a display item on a screen of the user's mobile device or of the user's vehicle. The parking facility management system may also store and/or access navigation information for the parking facility. Therefore, upon selecting one of the options, navigation instructions may be sent from the parking facility management system to the second user's vehicle to guide the user and/or the vehicle (e.g., an autonomous vehicle (AV)) to the selected parking spot. For instance, the navigation directions may be presented to the user in audio format, presented visually on a screen or a heads-up display, etc. In the event that the vehicle is an autonomous vehicle, the parking server may send navigation directions to the vehicle to enable the vehicle to self-navigate to the selected parking spot.

In one example, a unique reservation token for the parking spot may be sent from the parking facility management system to the vehicle and/or the user's mobile device. In addition, in one example, access to the parking spot may be blocked by a gate, a collapsible barrier (e.g., a mechanical pole or post that can be elevated automatically from the ground) at the entry point to the parking spot, or the like. Upon arrival at the parking spot selected, the token may be provided, e.g., to a near-field communication (NFC) reader or the like, which may verify the access token with the parking facility management system and may activate the collapsible barrier upon authorization from the parking facility management system such that the vehicle is provided entry access to the parking spot. In one example, entry to the parking spot may be detected by a sensor at the parking spot (such as a camera, an in-ground weight sensor, etc.) and notified to the parking facility management system. The parking facility management system may then update the parking spot inventory database record for the parking spot to note that the vehicle now occupies the parking spot. In one example, a unique identifier for the vehicle may be recorded in the record, such as a vehicle license plate number and the relevant state, a user identifier (ID), etc.

In one example, the parking facility management system may facilitate the retrieval of a user's autonomous vehicle. For example, a user may have opted to share the user's location data, itinerary, wait times, and other available data points as the user heads toward retrieving the vehicle, which may be provided by the user's mobile device to the parking facility management system (or alternatively, the parking facility management system may retrieve such data from one or more external sources with the user's specific authorization). The parking facility management system may therefore estimate a time at which the user will reach a location, such as a curbside pick-up location at the parking facility or off-site. The parking facility management system may also calculate an estimated time that it will take for the autonomous vehicle to navigate to the pick-up location and send instructions to the vehicle app with instructions and navigation directions to enable the autonomous vehicle to move itself to the pick-up location and to arrive at the designated time. The estimated time for the autonomous vehicle to arrive at the pick-up location may take into account any current wait times at the pick-up location, such as traffic, a vehicle queue, etc. In this manner, the user may meet the autonomous vehicle at the pick-up location, with both the user and the vehicle estimated to arrive at that location at around the same time. This approach will free up a parking spot for other users to use and also provide the user with a convenient service.

Similarly, data from the parking spot inventory database may be used to create an administrator monitoring view. For example, an overall view of the operations of the parking facility and parking spot statuses may be presented. To illustrate, alerts may be provided for vehicles that are occupying a space for an unexpected amount of time based on an expected retrieval time according to a user itinerary of a user associated with the vehicle. In one example, expected travel paths for vehicles that are either on the way to parking spots or are being retrieved from parking spots may be displayed. Cumulative occupancy rates for each parking spot may be displayed. For instance, a color-coded map of the parking facility may indicate that red spots are occupied less than 5% of the time, orange spots are occupied 5% to 20% of the time, yellow spots are occupied 20% to 50% of the time, Green spots are occupied 50% to 90% of the time, and blue spots are occupied more than 90% of the time. This type of data may be used for space planning, for instance, to understand where spots may be added or eliminated, or as a basis for pricing. These and other aspects of the present disclosure are discussed in greater detail below in connection with the examples of FIGS. 1-4.

Figure 1:
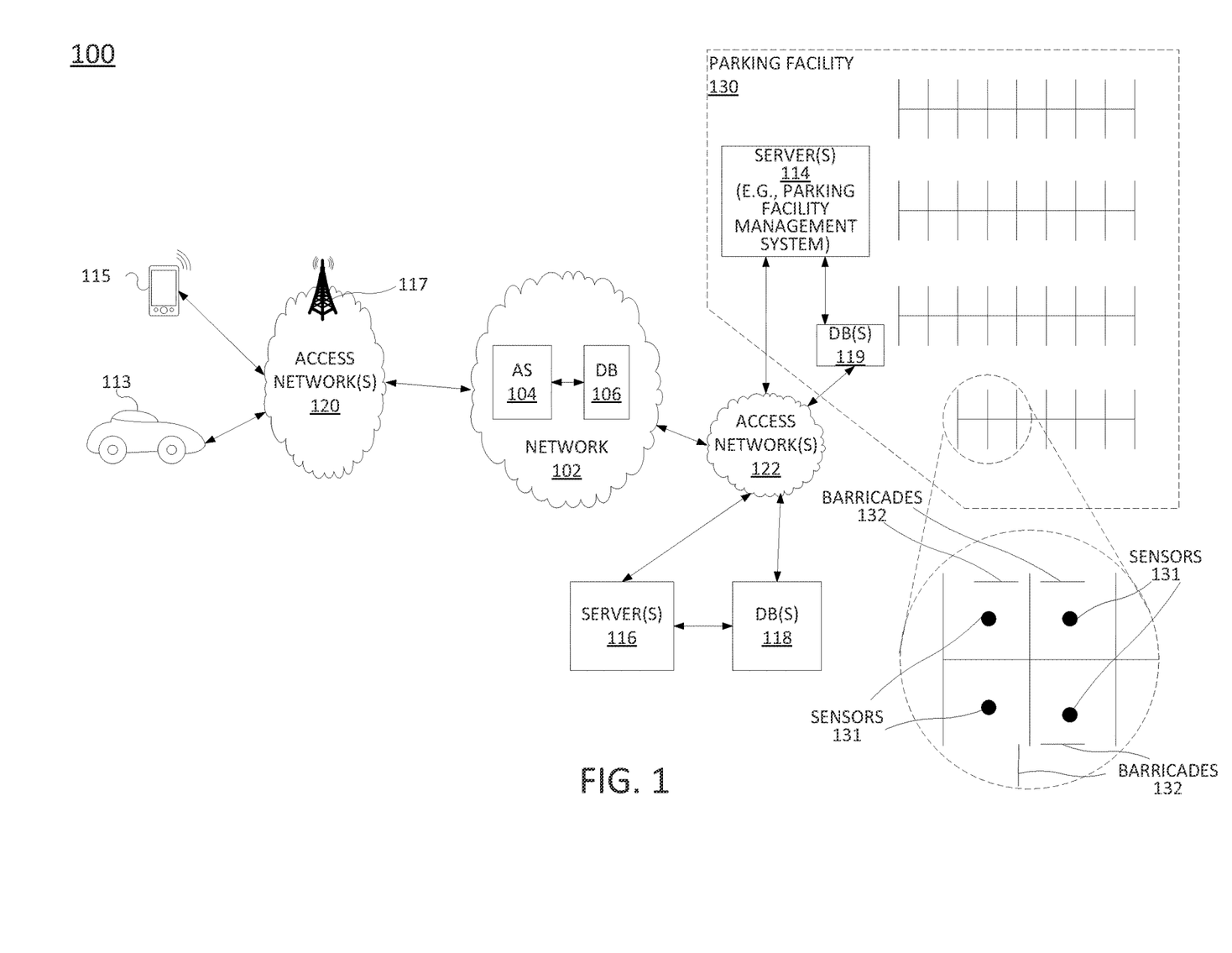
FIG. 1 illustrates an example network related to the present disclosure.

To further aid in understanding the present disclosure, FIG. 1 illustrates an example system 100 in which examples of the present disclosure for offering for a vehicle a parking spot of a parking facility that is predicted to be available and presenting information regarding predicted adjacent parking spot occupancy of the parking spot for a duration of an intended stay of the vehicle at the parking facility may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 include a wireless access point 117 (e.g., a cellular base station).

In one example, the access networks 120 may be in communication with various devices or computing systems/ processing systems, such as device 115, vehicle 113 (e.g., a computing system/processing system thereof, such as an on-board unit (OBU)), and so forth. Similarly, access networks 122 may be in communication with one or more devices or processing systems (e.g., computing systems), e.g., server(s) 114, DB(s) 119, server(s) 116, database (DB) 118, etc. Access networks 120 and 122 may transmit and receive communications between device 115, vehicle 113, server(s) 1124, DB(s) 119, server(s) 116 and/or database (DB) 118, application server (AS) 104 and/or database (DB) 106, other components of network 102, devices reachable via the Internet in general, and so forth.

In one example, device 115 may comprise a mobile computing device, a cellular smart phone, a laptop, a tablet computer, a desktop computer, a wearable computing device (e.g., a smart watch, a smart pair of eyeglasses, etc.), an application server, a bank or cluster of such devices, or the like. In accordance with the present disclosure, device 115 may comprise a computing system or server, such as computing system 400 depicted in FIG. 4, and may be configured to perform operations or functions in connection with examples of the present disclosure for offering for a vehicle a parking spot of a parking facility that is predicted to be available and presenting information regarding predicted adjacent parking spot occupancy of the parking spot for a duration of an intended stay of the vehicle at the parking facility (such as illustrated and described in connection with the example method 300 of FIG. 3). For instance, device 115 may include an application (app), a browser plug-in, or the like for a parking reservation service, and which may establish communication with server(s) 116 and/or server(s) 114 (e.g., a parking facility management system), and so forth.

Figure 3:
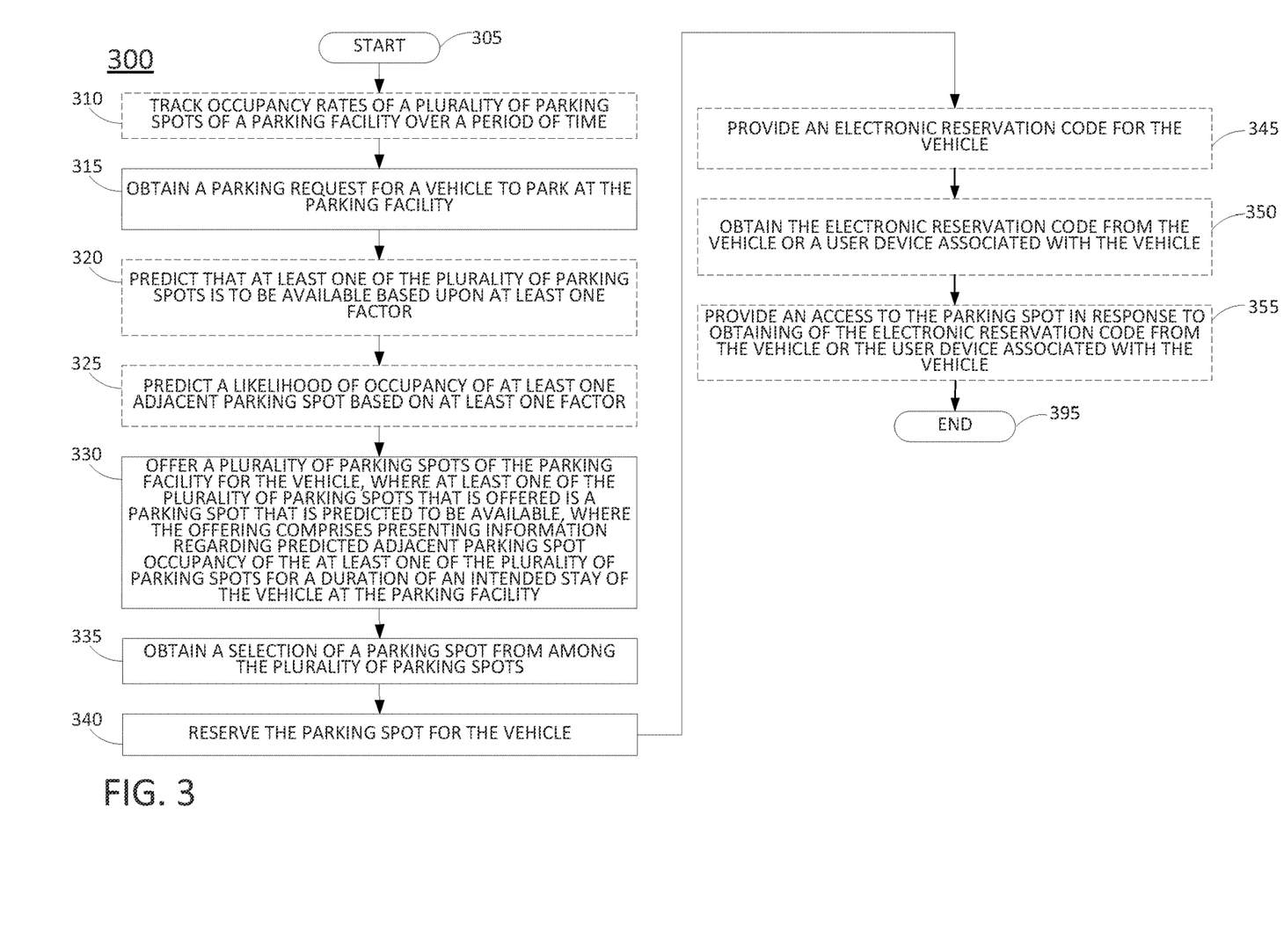
FIG. 3 illustrates a flowchart of an example method for offering for a vehicle a parking spot of a parking facility that is predicted to be available and presenting information regarding predicted adjacent parking spot occupancy of the parking spot for a duration of an intended stay of the vehicle at the parking facility.
Figure 4:
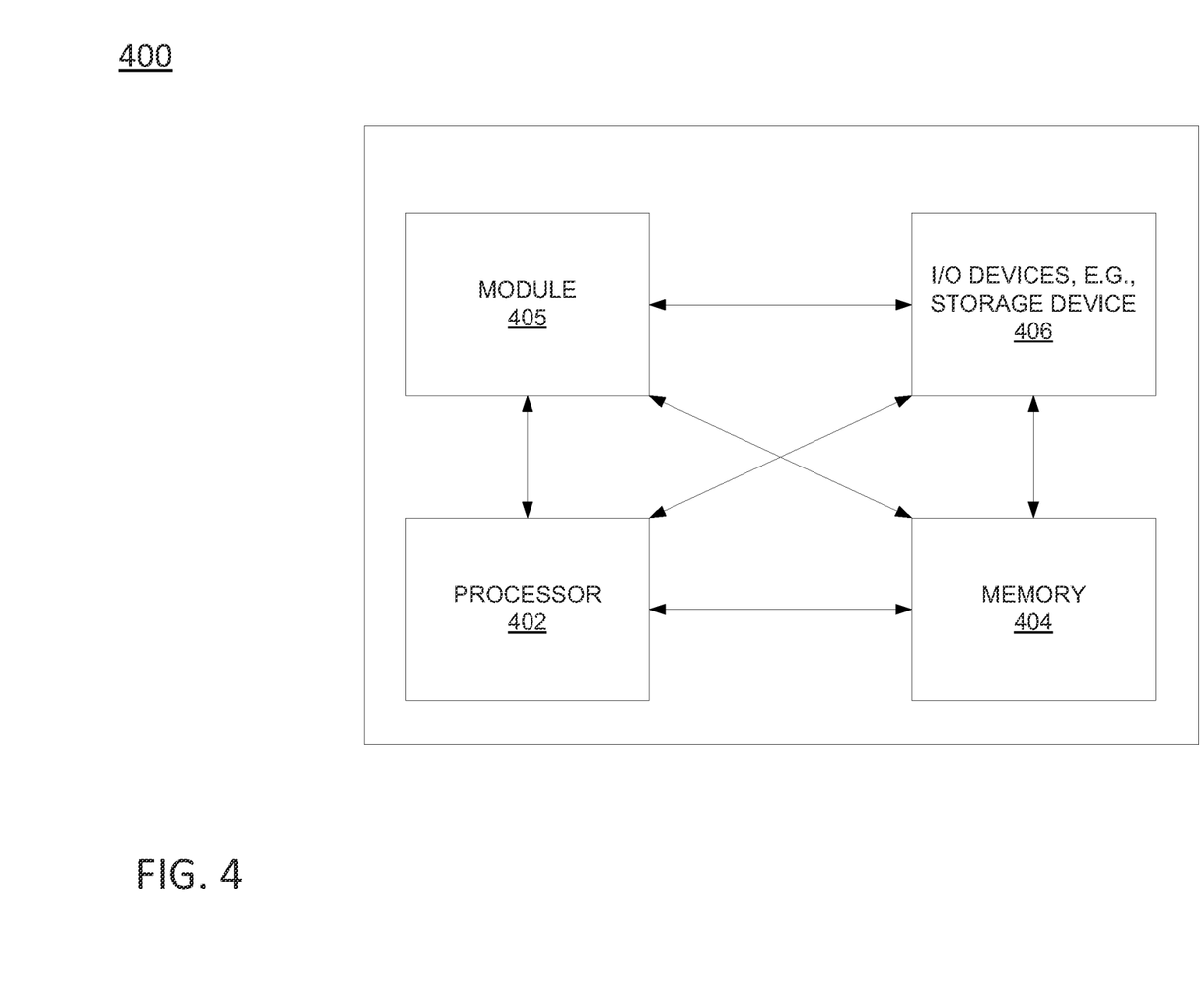
FIG. 4 illustrates a high level block diagram of a computing device specifically programmed to perform the steps, functions, blocks and/or operations described herein.

In one example, vehicle 113 may also include an on-board unit (OBU) which may comprise a computing system, or systems, such as one or more instances of computing system 400 depicted in FIG. 4, and may be configured to provide one or more functions in connection with examples of the present disclosure for offering for a vehicle a parking spot of a parking facility that is predicted to be available and presenting information regarding predicted adjacent parking spot occupancy of the parking spot for a duration of an intended stay of the vehicle at the parking facility (such as illustrated in FIG. 3 and described in greater detail below in connection with the example method 300). For instance, an OBU of vehicle 113 may include an application (app), a browser plug-in, or the like for a parking reservation service, and which may establish communication with server(s) 116 and/or server(s) 114 (e.g., a parking facility management system), and so forth. In one example, the OBU of vehicle 113 may be equipped for cellular communications, for communications via an LTE sidelink, a 5G sidelink, or the like, for communications via a dedicated short range communication (DSRC) networks, via IEEE 802.11 and/or 802.15-based communications, and so forth. It should be noted that in one example, vehicle 113 may comprise a self-driving, autonomous vehicle (AV), or may comprise a self-driving-capable vehicle that is operating in a self-driving/autonomous mode, e.g., where an operator/driver may disengage such feature and manually operate the vehicle at any time. However, in another example, vehicle 113 may not include such components and/or functionality. For instance, a user may manually operate the vehicle 113. Alternatively, or in addition, the device 115 of the user may be relied upon for purposes of gaining access to parking facility 130, and reserving or otherwise obtaining use of a parking spot therein for vehicle 113.

Server(s) 114 may comprise one or more servers providing a parking facility management service. For example, server(s) 114 may comprise a parking facility management system providing a parking facility management service for parking facility 130. In one example, each of the server(s) 116 may comprise a computing system or server, such as computing system 400 depicted in FIG. 4, and may individually or collectively be configured to perform operations or functions for offering for a vehicle a parking spot of a parking facility that is predicted to be available and presenting information regarding predicted adjacent parking spot occupancy of the parking spot for a duration of an intended stay of the vehicle at the parking facility (such as illustrated and described in connection with the example method 300 of FIG. 3).

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, DB(s) 119 may comprise one or more physical storage devices integrated with server(s) 114 (e.g., a database server), attached or coupled to the server(s) 114, or remotely accessible to server(s) 114 to store parking space utilization data, vehicle reservation data, and other information in accordance with the present disclosure. For example, DB(s) 119 may include a parking spot inventory database that may store for each parking spot, a current occupancy status, (for an occupied parking spot) an identifier of the vehicle and/or the user associated with a vehicle occupying the parking spot, an anticipated time of departure of the vehicle from the parking spot, etc., historical occupancy information, such as a percentage of time occupied/unoccupied, percentages of time occupied/unoccupied for various times of day, days of the week, and/or seasons, an underlying time series of data points of time when the parking spot is occupied and/unoccupied, and so forth. In one example, such a record may also include historical occupancy of adjacent parking spots data, such as a percentage of time the parking spot has adjacent parking spots occupied with vehicles. However, in another example, this information may be stored in connection with parking spot records for the neighboring parking spots, wherein the neighboring parking spot occupancy data may be retrieved from these other records when warranted in connection with a particular parking spot being under consideration.

As illustrated in FIG. 1, some or all of the parking spots in parking facility 130 may include sensors 131, e.g., for determining parking spot occupancy. For instances, sensors 131 may comprise in-ground weight sensors, image sensors, motion sensors, etc. For example, sensors 131 may alternatively or additionally comprise cameras that may detect whether a vehicle is or is not occupying a parking spot, a light gate sensor, or other sensors so capable. Accordingly, in one example, entries for parking spots in the parking spot inventory database may also include information regarding the sensors 131 in each parking spot, such as a device identifier (ID), an IP address, media access control (MAC) address, or the like to enable network-based communications with the sensors 131, sensor status (e.g., does a particular one of the sensors 131 indicate a spot is occupied or not based upon its sensor data), and so on. As further illustrated in FIG. 1, some or all of the parking spots in parking facility 130 may include barricades 132, such as electronically-controlled gates, electronically-controlled poles, posts, bollards or spikes that can be raised and lowered, and so on. Accordingly, in one example, entries for parking spots in the parking spot inventory database may also include information regarding the barricades 132 for each parking spot such as a device identifier (ID), an IP address, MAC address, or the like to enable network-based communications with the barricades 132, status information (e.g., is a barricade open/closed or up/down, etc.), and so forth. In one example, one or more of the sensors 131 and/or barricades 132 may include radio frequency (RF) transceivers for cellular communications and/or for non-cellular wireless communications, with server(s) 114. Alternatively, or in addition, each of the sensors 131 and/or barricades 132 may communicate with server(s) 114 via access network(s) 120. Thus, one or more of these sensor devices may have a wired or wireless connection to another local device that may have a connection to access networks 120.

In one example, DB(s) 119 may also include a customer/user database, that may store entries for each customer/user, such as a user name and/or user ID, user vehicle data, such as a make, model, year, color, etc., a vehicle size, an indication of whether the vehicle is an autonomous vehicle or is self-driving capable, an indication of whether the vehicle is an electric vehicle, a plug-in hybrid vehicle, or the like, user preferences, such as preferences for closest to destination parking spots, safest parking spots, least cost parking spots, parking spots least likely to have vehicles in adjacent parking spots, parking spots near a security station, parking spots under a bright street lamp, and so forth. Such a record/entry in the customer/user database may also include user itinerary information, such as a planned arrival at the parking facility 130, a planned departure from the parking facility 130, scheduled flight, ship, or train information, or the like, and so on. Similarly, such a record may include current status information of the user (such as a user of device 115), e.g., a current location, an expected time to transit an airport terminal, retrieve bags, and ride a tram to the parking facility 130, and so forth.

As illustrated in FIG. 1, access networks 122 may be in communication with one or more servers 116 and one or more databases (DB(s)) 118. In accordance with the present disclosure, each of the server(s) 116 may comprise a computing system or server, such as computing system 400 depicted in FIG. 4, and may individually or collectively be configured to perform operations or functions for offering for a vehicle a parking spot of a parking facility that is predicted to be available and presenting information regarding predicted adjacent parking spot occupancy of the parking spot for a duration of an intended stay of the vehicle at the parking facility (such as illustrated and described in connection with the example method 300 of FIG. 3). For instance, server(s) 116 may comprise a parking facility management system providing a parking facility management service (e.g., for parking facility 130). In one example, DB(s) 118 may comprise one or more physical storage devices integrated with server(s) 116 (e.g., a database server), attached or coupled to the server(s) 116, or remotely accessible to server(s) 116 to store various information in accordance with the present disclosure. For instance DB(s) 118 may comprise the same or similar database storing the same or similar information as DB(s) 119. In other words, server(s) 116 and DB(s) 118 may remotely provide a parking facility management service (e.g., for parking facility 130 and/or for any number of other parking facilities at diverse locations).

In an illustrative example, a user, via device 115 and/or vehicle 113 may seek to park vehicle 113 at the parking facility 130. The user may initiate a communication with server(s) 114 for this purpose via an app on device 115 and/or vehicle 113. The user may seek to make a reservation in advance for a future time period, or may do so as the vehicle 113 approaches or as vehicle 113 arrives at the parking facility 130. Server(s) 114 may access a parking spot inventory database of DB(s) 119 to identify available parking spots at the parking facility 130, and/or those that are anticipated to be available at a time of the user's arrival in vehicle 113. In one example, the user may indicate to server(s) 114 one or more requirements or preferences of the user and/or of vehicle 113, such as a vehicle size, an expected time and/or date of arrival (if the user is making a reservation in advance), an expected time and/or date of departure, a preference for a least cost parking spot or less expensive parking spot, a preference for a low likelihood of vehicles in adjacent parking spots, a destination after parking (such as an airline terminal, etc.), and so forth. Alternatively, or in addition, server(s) 114 may retrieve some or all of this information from a record in a user/customer database of DB(s) 119.

In accordance with the present disclosure, server(s) 114 may determine a parking spot's anticipated availability, or likelihood of occupancy at a future time period in several ways. First, for a parking space having a specific reservation for a current time period or designated future time period, the parking space may be predicted/forecast to be unavailable with 100 percent likelihood. It should be noted that even though there may always be a chance that a vehicle and/or user does not arrive for the reservation, in one example, this may still be quantified as a 100 percent likelihood of being unavailable (and hence zero percent likely to be available). However, in another example, the predicted likelihood of availability may be set to 95 percent, 98 percent, or another value, which may be based upon an overall cancellation and/or no-show rate, a cancellation/no-show rate of the user holding the reservation, etc. For spaces that have no specific reservations (or in the case that the parking facility 130 is operated such that no specific parking spaces may be reserved), the likelihood that a parking spot will be available/unoccupied or unavailable/occupied at a given future time may be predicted using various input data and using various machine learning-based or other predictions and/or forecasting techniques. In one example, the MLM(s) or other prediction/forecasting models may be trained at server(s) 114 and/or at a network-based processing system (e.g., server(s) 116, or the like).

For instance, in accordance with the present disclosure, predicting a future occupancy of a parking spot may be in accordance with one or more machine learning algorithms (MLAs), e.g., one or more trained machine learning models (MLMs). For instance, a machine learning algorithm (MLA), or machine learning model (MLM) trained via a MLA may comprise a deep learning neural network, or deep neural network (DNN), a generative adversarial network (GAN), a decision tree algorithms/models, such as gradient boosted decision tree (GBDT) (e.g., XGBoost, or the like), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. For instance, a distance from a separation hyperplane of a binary classifier may be scaled to a percentage likelihood, e.g., of whether a parking spot will or will not be occupied (or vacant) at a given future time period for which the classifier provides such prediction.

In one example, a prediction (or forecast) of whether a parking spot will or will not be occupied at a future time period may be made using a time series prediction/forecasting model, e.g., based upon past and current occupancy/vacancy as predictors, such as a moving average (MA) model, an autoregressive distributed lag (ADL) model, an autoregressive integrated moving average (ARIMA) model, a seasonal ARIMA (SARIMA) model, or the like. Similarly, other regression-based models may be trained and used for prediction, such as logistic regression, polynomial regression, ridge regression, lasso regression, etc. In one example, the present disclosure may predict/forecast future parking spot occupancy/vacancy using multiple factors as predictors (e.g., covariates, or exogenous factors). For instance, a seasonal auto-regressive integrated moving average with exogenous factors (SARIMAX) model may be used. Alternatively, a vector auto-regression (VAR), or VAR moving average (VARMA) model may be used. For instance, predictions/forecasts for multiple parking spots may be made in a multivariate analysis. Similarly, a vector auto-regression moving-average with exogenous factors/regressors (VARMAX) model may be applied. In one example, an output between 0 and 1 may indicate a probability (e.g., a likelihood) of the parking spot being occupied (or unoccupied) at a future time period. For instance, an output of 0.5 may indicate a 50% probability/likelihood of the parking spot being occupied (or unoccupied) at the future time period.

In one example, an MLM for predicting future parking spot occupancy/vacancy may comprise a recurrent neural network (RNN), a long-short term memory (LSTM) neural network, or the like. For instance, RNNs and LSTMs may be trained on and make predictions with respect to time series data. In another example, an MLM for detecting a deviation from an expected travel sequence may comprise a convolutional neural network (CNN) that is suitable for time series data, such as an AlexNet or WaveNet. In accordance with the present disclosure, inputs/predictors for any or all of such prediction or forecasting models may include past and current occupancy/vacancy information of a parking spot. In one example, inputs/predictors may further include covariates, such as reservations for specific parking spots, reservations for particular types of parking spots (e.g., without specific parking spots being associated with such reservations), known events that may be input by an operator (e.g., personnel of parking facility 130), such as a large convention, a major sporting event or concert, known local school vacation weeks, past or current weather, or weather predictions for one or more future time periods (e.g., from a weather data feed), user factors associated with users having vehicles currently parked or having upcoming reservations (such as user preferences for covered parking spots, least-cost parking spots, etc., cancellation rates of users known to the parking facility 130 based upon past experiences, etc.), and so forth.

Thus, server(s) 114 may apply these inputs to one or more prediction models to generate predictions/forecasts for the likelihood of candidate parking spots being occupied/vacant at a future time period for which the user associated with vehicle 113 is seeking to reserve a parking spot. Similarly, server(s) 114 may utilize the same or different prediction models to generate predictions/forecasts for the likelihood of adjacent parking spots being occupied/vacant during the course of time that the user intends to park the vehicle 113 at the parking facility 130. Adjacent parking spot occupancy prediction may serve as an important parameter for a user. For example, one user may want to have as few vehicles as possible that will be parked next to his or her parked car during the course of time that the user intends to park the vehicle 113 at the parking facility 130. One concern may comprise the likelihood of potential damage to the user's parked car when occupants exit or enter neighboring parked cars, e.g., an occupant exiting in a hurry to make a flight or an occupant carrying a large piece of luggage trying to enter the neighboring parked car. In another example, another user may want to have as many vehicles as possible that will be parked next to his or her parked car during the course of time that the user intends to park the vehicle 113 at the parking facility 130. One concern may comprise the likelihood of potential damage to the user's car due to break-ins, or vandalism, or other safety issues, e.g., when a car is broken into when the car is parked at a remote section of the parking facility with very few other parked cars, or a user having to walk to the parked car at a remote section of the parking facility with very few other parked cars late at night, and so on. Accordingly, this adjacent parking spot information may be presented or made available to the user via device 115 and/or vehicle 113 in association with any candidate parking spot. In another example, the user may have no reservation but may access the parking facility 130 and seek a parking spot. In this case, any available parking spot (e.g., those that are currently open and/or those that are open and not reserved for the time the user expects to park the vehicle 113) may be presented to the user along with information comprising a prediction, e.g., a likelihood, that adjacent parking spots will or will not also be occupied during the course of time.

Figure 2:
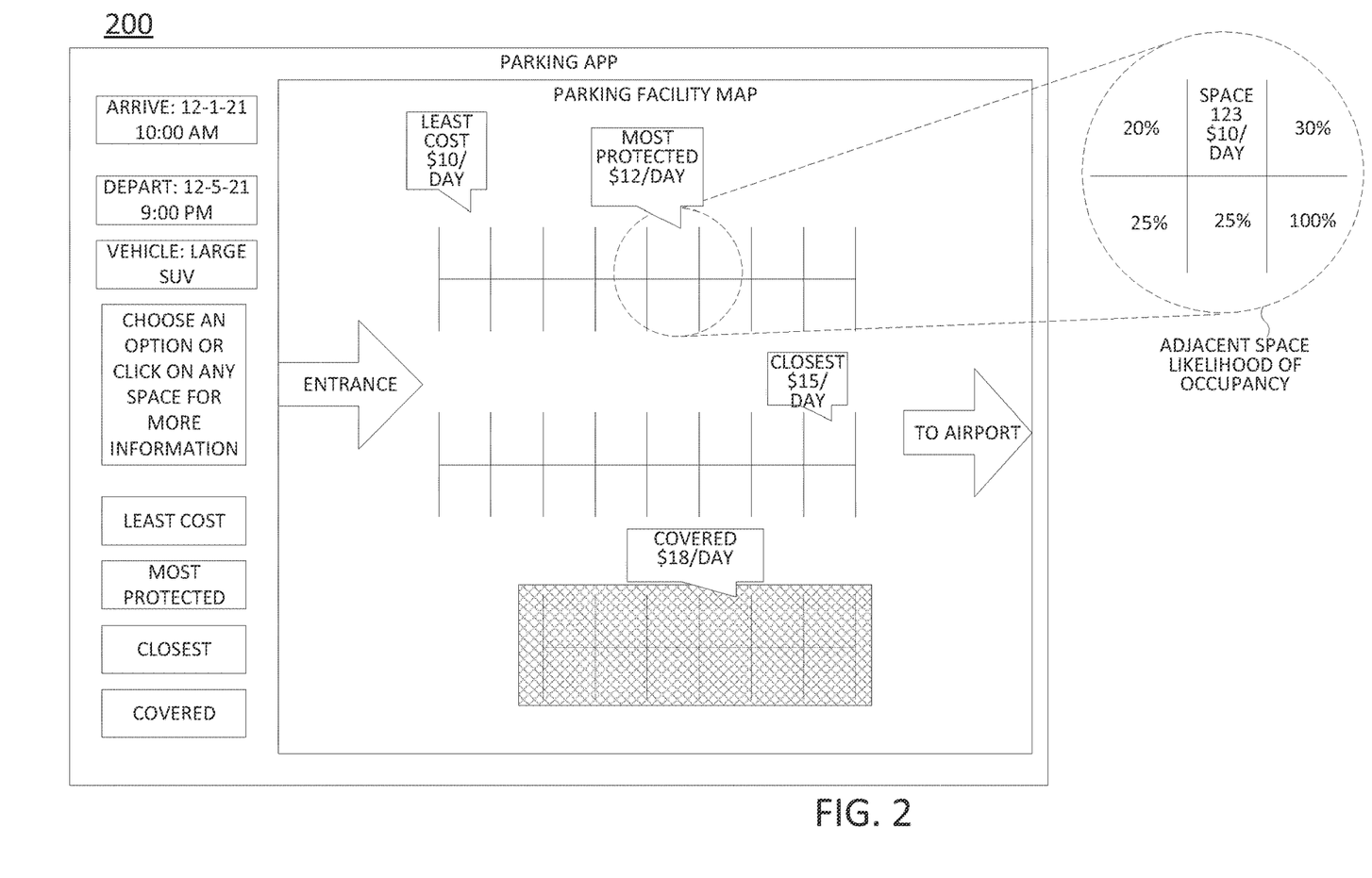
FIG. 2 illustrates an example user interface of a parking application, in accordance with the present disclosure.

In any event, server(s) 114 may then match available and/or anticipated-to-be-available parking spots to the user's criteria (e.g., user and/or vehicle requirements and/or preferences), and may present any matching parking spots that fulfill the user's criteria. In one example, server(s) 114 may present all available parking spots that meet/fulfill the user's criteria. In one example, server(s) 114 may present one or more representative parking spots, e.g., if there are many available. For instance, server(s) 114 may present a "closest" parking spot that is available or anticipated to be available, where there may be several available parking spots all having relatively the same distance to a destination after parking. Similarly, a "lowest cost" parking spot that is available or anticipated to be available may be selected from among several that are all the same cost according to one or more selection criteria. For instance, an operator of parking facility 130 may prefer that the lowest cost parking space(s) that are closest to the user's destination after parking be highlighted. On the other hand, the parking facility 130 may prefer to try and fill up parking spaces in a particular zone and may highlight one or more least cost parking spaces in such zone, e.g., intentionally channeling users to a particular zone of the parking facility to improve efficiency, e.g., clearing an area of parked cars in anticipation of a pending snow storm. However, the user may still be enabled to peruse all available spots via the app on the user's device 115 and/or via a screen or the like of vehicle 113, such as by zooming or scrolling on a map of the parking facility 130 showing all available parking spaces, their availabilities/occupancies, prices, features (such as parking spot size, covered/uncovered condition, or surface type (e.g., paved, gravel, etc.)), adjacent parking spot historical occupancy data, and so forth. In this regard, an example user interface, or display screen, presenting offered parking spaces of a parking facility is illustrated in FIG. 2 and described in greater detail below. In addition, as noted above, predicted occupancy of adjacent parking spots may be presented as additional information for a user, which may assist the user in making a selection of a parking spot. Alternatively, or in addition, the predicted occupancies (e.g., likelihood of occupancy) of adjacent parking spots may be used to determine parking spots that meet/do not meet the user's criteria (and hence to determine which candidate parking spots may be presented for the user in a first instance).

In one example, the user may also change criteria via the app to view different available and/or anticipated-to-be-available parking spaces of the parking facility 130 (e.g., which meet the changed/different criteria), or may otherwise view all available and/or anticipated-to-be-available parking spaces of the parking facility 130 (and in one example may further view spaces that are occupied or otherwise unavailable, such as parking spots being held for other upcoming reservations). In an example in which the user is making a reservation in advance (e.g., as vehicle 113 is on the way to parking facility 130, or well in advance, such as days, weeks, or months before a planned flight/trip, a planned visit to a city center, etc.), the user may select a parking spot to reserve. Server(s) 114 may then update a record in the parking spot inventory database of DB(s) 119 to indicate that the selected parking spot is being held for the user and/or vehicle 113 (e.g., from a present time until the arrival of vehicle 113, or for some future time period, such as weeks later when the user has a planned event or trip). Alternatively, the user may select to reserve a type of parking spot (e.g., a covered parking spot) without a reservation for a specific one of the covered spots. In such case, server(s) 114 may allow other covered spots to be reserved for overlapping or partially overlapping time periods of the user's reservation, so long as one covered parking spot remains available for assigning to vehicle 113 when vehicle 113 arrives. In one example, server(s) 114 may keep separate records in parking spot inventory database of DB(s) 119 for these types of reservations. These records may be used when calculating a likelihood of parking spot occupancy at a future time period (e.g., for a parking spot under consideration and/or for adjacent parking spot(s) of a parking spot under consideration). These records may also be used by server(s) 114 to make sure that a last spot of the type requested by the user is not given away to another for a time of the user's reservation.

In one example, server(s) 114 may provide an access token to device 115 and/or an on-board unit of vehicle 113 to permit access to a selected/reserved parking spot, or a parking spot of a selected type (e.g., access to any available covered parking spot when the vehicle 113 arrives at parking facility 130). The access token may comprise an electronic code that may also be presented by device 115 and/or vehicle 113 to access parking facility 130. For instance, parking facility 130 may have a main entrance and exit with an access gate. The access gate may be opened by an attendant, or by users taking tickets from a dispenser. However, the access gate may also include an NFC sensor/scanner that may transmit a request for a code, in response to which an app on the device 115 and/or the OBU of vehicle 113 may provide the access token in response (such as via an IEEE 802.15-based communication, via a radio frequency identification (RFID) interrogation and response, etc.). The access token may be forwarded to server(s) 114 for verification (e.g., to see that the access token matches the one provided), whereupon server(s) 114 may instruct the access gate to open and permit vehicle 113 to enter.

Alternatively, or in addition, the access token may be presented to access the designated parking spot (or an available parking spot of a reserved parking spot type). For example, parking facility 130 may include additional NFC sensors/scanners, which may detect the presence of device 115 and/or vehicle 113 in front of or near a parking spot. Alternatively, or in addition, such an NFC scanner may be adjacent to a parking spot for user to swipe device 115 to cause the access token to be provided by the app of device 115 to the NFC scanner. In the same manner as above, the access token may be provided to server(s) 114 for verification, and a corresponding instruction to open one of the barricades 132 may be received therefrom. A corresponding one of the sensors 131 for the parking space may then detect that the vehicle 113 has entered and/or stopped within the parking space, and may notify server(s) 114 accordingly (or servers(s) 114 may access the sensor data therefrom to determine the occupancy of the parking space). As noted above, the status of the parking space may be changed in the corresponding record for the parking spot in the parking spot inventory database of DB(s) 119.

In an example in which the parking spot is not specifically reserved for the vehicle 113 (e.g., where the user has made a reservation only for a type of parking spot) or where the user does not have a reservation but simply arrives with vehicle 113 looking for an available parking spot), the record may also be updated with expected occupancy data, e.g., based upon the user's itinerary, an indicated expected return/vehicle pick-up date and/or time, etc. Alternatively, or in addition, the record of the parking space in the parking spot inventory database of DB(s) 119 may be updated with a link a user record containing the same or similar information.

It should again be noted that in another example, the same or similar functions may be provided by server(s) 116 and/or database(s) 118, e.g., on behalf of multiple parking facilities, such as parking facility 130. In one example, network 102 may also include an application server (AS) 104 and a database (DB) 106. In one example, AS 104 may perform the same or similar functions as server(s) 114 and/or server(s) 116. Similarly, DB 106 may store the same or similar information as DB(s) 119 and/or DB(s) 118. For instance, network 102 may provide a service to subscribing parking facilities, users/user devices, and/or vehicles in connection with a parking facility management service, e.g., in addition to television, phone, and/or other telecommunication services. In one example, AS 104, DB 106, server(s) 114, DB(s) 119, server(s) 116, and/or DB(s) 118, device 115 and/or vehicle 113, may operate in a distributed and/or coordinated manner to perform various steps, functions, and/or operations described herein.

It should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server(s) 114, DB(s) 119, server(s) 116, and/or DB(s) 118 may be in communication with network 102 via different access networks, and so forth. Thus, these and other modifications are all contemplated within the scope of the present disclosure.

To further aid in understanding the present disclosure, FIG. 2 illustrates an example user interface 200 of a parking application (app) in accordance with the present disclosure. For instance, the user interface 200 may be presented via a display screen of a user device, a vehicle of the user, and so forth. In the example of FIG. 2, the user interface 200 presents a map of a parking facility. The user interface 200 may include various interactive features, such as boxes to input anticipated arrival and departure information (e.g., time and duration of stay), vehicle information, preferred options for displaying available parking spots (e.g., least cost, most protected, closest, covered, brightest, or the like), and so forth. The map of the parking facility may show the parking spots and their locations within the parking facility. In addition, parking spots may be specifically pointed out based on various criteria. For instance, a user may input preferences for least cost parking spots, most protected, etc. Alternatively, or in addition, a parking facility management system may store a user profile that includes such user preferences (e.g., as provided by the user or inferred based upon past interactions with the user), which may be used to identify particular parking spots and/or types of parking spots that may best meet the user's requirements and/or preferences.

In the present example, a least cost parking spot (e.g., one that is available or that is anticipated to be available) is indicated at a cost of $10 per day. It should be noted that there may be multiple parking spots having the same cost which may be similarly pointed out, e.g., with a dialog box, color coding/shading, or the like. However, for illustrative purposes a single least cost parking spot is indicated in the example of FIG. 2. Similarly, a "closest" parking spot is indicated at a cost of $15 per day. For instance, the user may input an itinerary that indicates an intended destination after parking (e.g., an airport terminal). As such, a parking facility management system may identify an available (or anticipated to be available) parking spot that is closest to the terminal (e.g., as indicated in the dialog box overlaid on the parking facility map). In addition, an available, or anticipated to be available, covered parking spot is indicated at a cost of $18 per day. It is again noted that there may be multiple covered parking spots available, or anticipated to be available, for the vehicle's expected stay (e.g., Dec. 1, 2021 10:00 AM to Dec. 5, 2021 9:00 PM). However, for illustrative purposes, a single covered parking spot is indicated in the example of FIG. 2.

As noted above, examples of the present disclosure may also account for the likelihood of occupancy of adjacent parking spaces. For instance, as discussed above, a parking facility management system may compute a likelihood of whether an adjacent parking space will or will not be occupied at one or more future time periods (e.g., during the expected stay of the user's vehicle). In one example, this may be based on the historical percentage of time that an adjacent space is/is not occupied. In another example, a prediction/forecast may be based on prediction model (or "predictive model") e.g., a regression model and/or a MLM-based prediction/forecasting model, using historical, time-series data regarding the occupancy of an adjacent space, and/or additional inputs/factors/predictors, such as upcoming reservations of other users, the preferences of such other users for types of parking spots, an overall level of demand for parking in the parking facility, known events of significance, e.g., sporting events, concerts, conventions, etc., weather conditions or predicted weather conditions, and so on. In the present example, the predictions/forecasts for likelihood of occupancy for a number of adjacent spaces may be used to calculate an overall score of "protectedness" of a parking spot. For instance, a summing of the percentages of likelihood of occupancy of a plurality of adjacent parking spots may comprise a protectedness score. It should be noted that this may result in a protectedness score over 100. However, this metric may be used solely to compare the relative protectedness of parking spots and is not a direct indication of likelihood of occupancy of an adjacent spot. Thus, for example, a parking spot that has only two adjacent parking spots may be considered more "protected" even if the likelihood of occupancy of both adjacent parking spots is over 50 percent, as compared to another parking spot that is adjacent to six other parking spots each having a likelihood of occupancy of 20 percent. In the example of FIG. 2, the user interface 200 may enable the user to click on a selected parking spot to obtain more details. For instance, the user may click or tap on the parking spot that is indicated as "most protected," and additional details may be provided, such as zoomed view of the parking spot and details regarding the likelihood of occupancy of adjacent parking spots. For instance, the likelihood of occupancy of adjacent parking spots may be 20%, 30%, 100%, 25%, and 25% respectively. It should be noted that the adjacent parking spot indicated with 100% likelihood may have this designated prediction/likelihood based upon an existing reservation and/or a vehicle currently occupying the parking spot (e.g., for an imminent arrival of the user's vehicle and/or for the vehicle already being present at the parking facility and the user or vehicle (e.g., an autonomous vehicle) actively looking for that particular parking space).

It should be noted that the FIG. 2 illustrates just one example of a user interface 200 in accordance with the present disclosure. Thus, other, further, and different example screens and/or user interface(s) may be utilized in various designs, different types of information may be presented for a user, and so forth. For instance, in one example, the user may double click on a parking space to be taken to a screen or overlay window which may start a confirmation process, e.g., "click 'yes' to confirm this parking spot, click 'no' to continue looking" or the like, and subsequent payment screens, receipt screens, etc. In one example, for parking spots that are occupied or which have reservations pending for the same or overlapping time period as the user is making a reservations, such parking spots may be presented with occupying vehicle information. For instance, the user may click on the parking space adjacent to "space 123" with the "100%" label and may be presented with information such as "4 door sedan; arrives 11-29-21; departs 12-4-21" (provided that the user of that parking space has authorized the parking facility management system to cause such information to be presented to other users). In one example, non-confidential information such as the physical size and make of a neighboring car can be readily shared with other users since the parked cars in a public parking facility are clearly visible publically, whereas confidential information such as duration of stay will not be shared unless with the consent of the pertinent user. In one example, driving directions may be provided and presented via a user interface to assist a user in navigating to a selected parking spot, and so forth. Thus, these and other modifications are all contemplated within the scope of the present disclosure.

FIG. 3 illustrates a flowchart of an example method 300 for offering for a vehicle a parking spot of a parking facility that is predicted to be available and presenting information regarding predicted adjacent parking spot occupancy of the parking spot for a duration of an intended stay of the vehicle at the parking facility, in accordance with the present disclosure. In one example, the method 300 is performed by a component of the system 100 of FIG. 1, such as by server(s) 114, server(s) 116, application server 104, and/or any one or more components thereof (e.g., a processor, or processors, performing operations stored in and loaded from a memory), by server(s) 114, server(s) 116, and/or application server 104, in conjunction with one or more other devices or computing/processing systems, e.g., device 115, vehicle 113, DB(s) 119, DB(s) 118, DB 106, and so forth. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 315.

At optional step 310, the processing system may track occupancy rates of a plurality of parking spots of a parking facility over a period of time. For instance, the processing system may collect and record in a database (e.g., a parking spot inventory database or the like) occupancy data of the parking spots of the parking facility. In one example, this may be based upon sensor data indicating parking spot occupancy and/or vacancy, or other data indicative of whether and when parking spots are occupied (and/or unoccupied).

At step 315, the processing system obtains a parking request for a vehicle to park at the parking facility. In one example, the parking request may include a preference for at least one of: a type of parking spot, a lesser likelihood of occupancy of adjacent parking spots, a lower cost, a location, or a lesser distance to a reference location (e.g., shortest walking distance to an airline terminal or other buildings, to a bus pickup location, etc.). Alternatively, or in addition, the parking request may include a preference for distances, costs, or likelihood of adjacent parking spot occupancy being below respective distance, cost, or likelihood of occupancy thresholds, or the like. In one example, the parking request may also include a duration of an intended stay of the vehicle at the parking facility.

At optional step 320, the processing system may predict that at least one of the plurality of parking spots is to be available based upon at least one factor. For instance, the at least one factor may comprise an occupancy rate of the parking spot over a period of time. For instance, in one example, the processing system may track occupancy rates of the plurality of parking spots over the period of time at optional step 310. In various examples, the at least one factor may further include a demand level for parking spots of the parking facility, a demand level for parking spots of a type of parking spot of the at least one of the plurality of parking spots at the parking facility, historic demand levels for the parking spots of at least a portion of the parking facility including the parking spot (e.g., a parking zone or section, or the entire parking facility), and/or historic demand levels for the parking spots of the type of parking spot of the at least one of the plurality of parking spots at the parking facility. With respect to a type of parking spot, the parking facility may include a plurality of types of parking spots, such as: covered parking spots, uncovered parking spots, indoor parking spots, outdoor parking spots, paved parking spots, unpaved parking spots, oversize vehicle parking spots, compact vehicle parking spots, brightly lit parking spots, or parking spots with electric vehicle charging stations, and so on. The at least one factor may also include an expected departure of a second vehicle occupying the at least one of the plurality of parking spots based upon an user itinerary associated with the second vehicle, a weather prediction, or a scheduled event (e.g., a concert, sporting event, convention, etc.). In one example, the prediction of optional step 320 may be via a predictive model, where the at least one factor may comprise an input feature of the predictive model, and where an output of the predictive model may comprise the likelihood of occupancy of the parking spot. For instance, the predictive model may comprise a regression and/or time series-based predictive model, a machine learning-based predictive model (e.g., a LSTM, RNN, or the like), or other such predictive models as discussed above, and so forth.

At optional step 325, the processing system may predict a likelihood of occupancy of at least one adjacent parking spot (e.g., adjacent to a parking spot under consideration) based on at least one factor. For instance, the prediction may be via a predictive model, where the at least one factor may comprise an input feature of the predictive model, and where an output of the predictive model may comprise the likelihood of occupancy of the at least one adjacent parking spot. Similar to optional step 320, the predictive model may comprise a regression and/or time series-based predictive model, a machine learning-based predictive model (e.g., a LSTM, RNN, or the like), or other such predictive models as discussed above, and so forth. In addition, the at least one factor may comprise the same or similar factors as discussed above in connection with optional step 320.

At step 330, the processing system offers one or more parking spots of the parking facility for the vehicle. In one example, at least one of the plurality of parking spots that is offered is a parking spot that is predicted to be available at optional step 320. In addition, in one example, step 330 may include presenting information regarding predicted adjacent parking spot occupancy (e.g., predicted occupancy of parking spots immediately next to the offered spot, e.g., north, east, south and west of the offered spot; or north, northeast, east, southeast, south, southwest, west and northwest of the offered spot; and so on) of the at least one of the plurality of parking spots for a duration of an intended stay of the vehicle at the parking facility. In one example, the information regarding predicted adjacent parking spot occupancy may comprise a likelihood of occupancy of at least one adjacent parking spot (e.g., at any point during a duration of an intended stay of the vehicle at the parking facility). For instance, such likelihood may be predicted, e.g., computed, at optional step 325. In one example, the at least one of the plurality of parking spots that is offered may be of a type of parking spot that is specified, e.g., by a user preference indicated as part of the parking request obtained at step 315. In one example, the predicted adjacent parking spot occupancy of the at least one of the plurality of parking spots that is offered may comprise a likelihood of occupancy below a threshold likelihood of occupancy (e.g., in an example in which the user has specified such a threshold as a user preference, or where the user has expressed a preference for a "most protected" parking spot, or the like, and where only parking spots having adjacent parking spots with a likelihood of occupancy below a threshold may be considered and offered to the user). For example, the likelihood of occupancy of adjacent parking spots can be presented as additional information to the user without the user specifying a preference. The user may then consider this information, and may base a selection of a parking spot upon this information, even if the user did not specifically request this information in advance.

In another example, the likelihood of occupancy of adjacent parking spots do not necessarily have to be below a threshold, but collectively may indicate a lesser likelihood of having a neighboring vehicle as compared to other available (or predicted to be available) parking spots. Similarly, in an example in which the user may have specified a preference for a parking spot having a distance to a reference location (e.g., a destination after parking, or other locations) below a threshold distance, the at least one of the plurality of parking spots that is offered at step 330 may have a distance to the reference location below such a threshold distance. However, in another example, the at least one of the plurality of parking spots that is offered may not necessarily have a distance to the reference location below a distance threshold, but could have a lesser/least distance among available parking spaces. In one example, step 330 may further include presenting information regarding a current occupancy of at least one adjacent parking spot to the at least one of the plurality of parking spots. In addition, in one example, step 330 may comprise presenting a map of the parking facility indicating a location of the at least one of the plurality of parking spots. The map may further include information regarding adjacent parking spots, such as illustrated in the example of FIG. 2 and discussed above.

At step 335, the processing system obtains a selection of a parking spot from among the plurality of parking spots. For instance, the selection may be obtained from a user's mobile or other computing devices, from the vehicle (e.g., an on-board unit thereof), or the like. For example, the user may provide an input via a touchscreen, via a keyboard, a mouse, via a voice command, and so forth. In another example, step 335 may comprise the user and/or the vehicle (e.g., an autonomous vehicle) navigating to a parking spot and occupying the parking spot. In other words, in one example, the selection may be made by physical presence and occupying the offered spot.

At step 340, the processing system reserves the parking spot for the vehicle. For instance, the processing system may update a record in a parking spot inventory database to indicate that the parking spot is presently unavailable (and/or or at a future time period for which the user has requested the reservation). The record may further include an identifier of the user and/or the vehicle, the anticipated duration of stay and/or expected arrival and/or departure dates and/or times, etc. In one example, the record may be updated to include a user itinerary. However, in another example, the record may include a link to a user record in a user database that may include such an itinerary. In one example, step 340 may comprise recording a change of occupancy status of the parking spot based upon the vehicle occupying the spot at step 335.

At optional step 345, the processing system may provide an electronic reservation code for the vehicle. For instance, the electronic reservation code may comprise an access code to enter the parking facility, a specific parking spot in the parking facility, and/or a class of parking spots. The electronic reservation code may be provided to a mobile device of the user and/or to the vehicle (e.g., depending on the vehicle's capabilities and/or the preference of the user, etc.).

At optional step 350, the processing system may obtain the electronic reservation code from the vehicle or a user device associated with the vehicle. For instance, the vehicle or user device may present the electronic reservation code via a wireless signal in response to an interrogation signal from an NFC scanner or the like, which may transmit the electronic reservation code to the processing system for verification.

At optional step 355, the processing system may provide an access to the parking spot in response to the obtaining of the electronic reservation code from the vehicle or the user device associated with the vehicle. In one example, the access may be provided via a barricade opening/closing or rising/falling. For instance, the processing system may provide an affirmative verification to an NFC scanner or the like, which may cause a connected, electronically-controlled barricade to lower and/or to open. Alternatively, the processing system may send an instruction to the barricade to lower and/or open for the vehicle.

Following step 340 or any of optional steps 345-355, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 to obtain additional or different user preferences and to change the offered parking spots in response thereto, may repeat one or more steps of the method 300 for different reservations of the same user or for a different user, and so forth. In one example, the method 300 may include updating data regarding the occupancy rate of the parking spot selected by the user, e.g., for use in further computations of likelihood of occupancy at future time periods for the benefit of other users, and so forth. In one example, step 335 may include obtaining an input to reserve a type of parking spot, and step 340 may include reserving the type of parking spot at the parking facility (e.g., rather than a specific parking spot). In still another example, step 320, step 325, or both may be performed prior to step 330. For instance, the processing system may make these computations on an ongoing basis, e.g., without necessarily having a specific user request for a reservation. In still another example, a user accepting an offered parking spot may impact the adjacent occupancy prediction for another user. If such adjacent occupancy prediction is impacted, the method may update its adjacent occupancy predictions and notify the pertinent impacted user(s) via a notification, e.g., via a text notification stating "A car has now occupied a spot directly east of your parked car," "A car has now occupied a spot directly west of your parked car," "A car has now occupied a spot directly to the right of your parked car," and so on.

In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIG. 2 or 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for offering for a vehicle a parking spot of a parking facility that is predicted to be available and presenting information regarding predicted adjacent parking spot occupancy of the parking spot for a duration of an intended stay of the vehicle at the parking facility, and various input/output devices 406, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for offering for a vehicle a parking spot of a parking facility that is predicted to be available and presenting information regarding predicted adjacent parking spot occupancy of the parking spot for a duration of an intended stay of the vehicle at the parking facility (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for offering for a vehicle a parking spot of a parking facility that is predicted to be available and presenting information regarding predicted adjacent parking spot occupancy of the parking spot for a duration of an intended stay of the vehicle at the parking facility (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a parking request for a vehicle to park at a parking facility;
offering, by the processing system, a plurality of parking spots of the parking facility for the vehicle, wherein at least one of the plurality of parking spots that is offered is a parking spot that is predicted to be available, wherein the offering comprises presenting information regarding predicted adjacent parking spot occupancy of the at least one of the plurality of parking spots for a duration of an intended stay of the vehicle at the parking facility;
obtaining, by the processing system, a selection of a parking spot from among the plurality of parking spots; and
reserving, by the processing system, the parking spot for the vehicle.

2. The method of claim 1, further comprising:
predicting the at least one of the plurality of parking spots is to be available based upon at least one factor.

3. The method of claim 2, wherein the at least one factor comprises:
an occupancy rate of the at least one of the plurality of parking spots over a period of time;
a demand level for parking spots of the parking facility;
a demand level for parking spots of a type of parking spot of the at least one of the plurality of parking spots at the parking facility;
historic demand levels for the parking spots of at least a portion of the parking facility including the at least one of the plurality of parking spots;
historic demand levels for the parking spots of the type of parking spot of the at least one of the plurality of parking spots at the parking facility;
an expected departure of a second vehicle occupying the at least one of the plurality of parking spots based upon an user itinerary associated with the second vehicle;
a weather prediction; or
a scheduled event.

4. The method of claim 3, wherein the type of parking spot is one of a plurality of types of parking spots, wherein the plurality of types of parking spots comprises at least two of:
covered parking spots;
uncovered parking spots;
indoor parking spots;
outdoor parking spots;
paved parking spots;
unpaved parking spots;
oversize vehicle parking spots;
compact vehicle parking spots; or
parking spots with electric vehicle charging stations.

5. The method of claim 2, wherein the predicting is via a predictive model, wherein the at least one factor comprises an input feature of the predictive model, and wherein an output of the predictive model comprises a likelihood of occupancy of the at least one of the plurality of parking spots at a designated future time period.

6. The method of claim 1, further comprising:
tracking occupancy rates of the plurality of parking spots over a period of time.

7. The method of claim 1, wherein the offering further comprises presenting information regarding a current occupancy of at least one adjacent parking spot to the at least one of the plurality of parking spots.

8. The method of claim 1, wherein the information regarding predicted adjacent parking spot occupancy comprises a likelihood of occupancy of at least one adjacent parking spot to the at least one of the plurality of parking spots.

9. The method of claim 8, wherein the likelihood of occupancy of the least one adjacent parking spot is based upon at least one factor.

10. The method of claim 9, wherein the at least one factor comprises:
an occupancy rate of the at least one adjacent parking spot over a period of time;
a demand level for parking spots of the parking facility;
a demand level for parking spots of a type of parking spot of the at least one adjacent parking spot at the parking facility;
historic demand levels for the parking spots of at least a portion of the parking facility including the parking spot and the at least one adjacent parking spot;
historic demand levels for the parking spots of the type of parking spot of the at least one adjacent parking spot at the parking facility;
an expected departure of a second vehicle occupying the at least one adjacent parking spot based upon an user itinerary associated with the second vehicle;
a weather prediction; or
a scheduled event.

11. The method of claim 9, further comprising:
predicting the likelihood of occupancy of the at least one adjacent parking spot via a predictive model, wherein the at least one factor comprises an input feature of the predictive model, and wherein an output of the predictive model comprises the likelihood of occupancy of the at least one adjacent parking spot.

12. The method of claim 1, further comprising:
providing an electronic reservation code for the vehicle;
obtaining the electronic reservation code from the vehicle or a user device associated with the vehicle; and
providing an access to the parking spot in response to the obtaining of the electronic reservation code from the vehicle or the user device associated with the vehicle.

13. The method of claim 12, wherein the access is provided via a barricade.

14. The method of claim 1, wherein the parking request includes a preference for at least one of:
a type of parking spot;
a lesser likelihood of occupancy of adjacent parking spots;
a lower cost;
a location; or
a lesser distance to a reference location.

15. The method of claim 14, wherein the at least one of the plurality of parking spots that is offered is of the type of parking spot.

16. The method of claim 15, wherein the predicted adjacent parking spot occupancy of the at least one of the plurality of parking spots that is offered comprises a likelihood of occupancy below a threshold likelihood of occupancy.

17. The method of claim 14, wherein the at least one of the plurality of parking spots that is offered has a distance to the reference location below a threshold distance.

18. The method of claim 1, wherein the offering comprises presenting a map of the parking facility indicating a location of the at least one of the plurality of parking spots.

19. A non-transitory computer-readable medium storing instructions which, when executed by a processing system including at least one processor, cause the processing system to perform operations, the operations comprising:
- obtaining a parking request for a vehicle to park at a parking facility;
- offering a plurality of parking spots of the parking facility for the vehicle, wherein at least one of the plurality of parking spots that is offered is a parking spot that is predicted to be available, wherein the offering comprises presenting information regarding predicted adjacent parking spot occupancy of the at least one of the plurality of parking spots for a duration of an intended stay of the vehicle at the parking facility;
- obtaining a selection of a parking spot from among the plurality of parking spots; and
- reserving the parking spot for the vehicle.

20. An apparatus comprising:
a processing system including at least one processor; and
a computer-readable medium storing instructions which, when executed by the processing system, cause the processing system to perform operations, the operations comprising:
- obtaining a parking request for a vehicle to park at a parking facility;
- offering a plurality of parking spots of the parking facility for the vehicle, wherein at least one of the plurality of parking spots that is offered is a parking spot that is predicted to be available, wherein the offering comprises presenting information regarding predicted adjacent parking spot occupancy of the at least one of the plurality of parking spots for a duration of an intended stay of the vehicle at the parking facility;
- obtaining a selection of a parking spot from among the plurality of parking spots; and
- reserving the parking spot for the vehicle.

* * * * *